United States Patent [19]
Yoneyama

[11] 3,985,999
[45] Oct. 12, 1976

[54] CODE READOUT APPARATUS

[75] Inventor: Tsuneo Yoneyama, Yokosuka, Japan

[73] Assignee: Tokyo Shibaura Electric Co., Ltd., Kawasaki, Japan

[22] Filed: Mar. 21, 1974

[21] Appl. No.: 453,294

[30] Foreign Application Priority Data
Mar. 26, 1973 Japan.............................. 48-33498

[52] U.S. Cl........................... 235/61.11 E; 250/555
[51] Int. Cl.²..................... G06K 7/10; E04G 17/00
[58] Field of Search............. 235/61.11 E; 250/568, 250/569, 206, 555

[56] References Cited
UNITED STATES PATENTS

| | | |
|---|---|---|
| 3,716,699 | 2/1973 | Eckert, Jr. et al. .......... 235/61.11 E |
| 3,832,529 | 8/1974 | Nakamura.................... 235/61.11 E |
| 3,835,453 | 9/1974 | Narayanan .................. 235/61.11 E |

*Primary Examiner*—Vincent P. Canney
*Attorney, Agent, or Firm*—Oblon, Fisher, Spivak, McClelland & Maier

[57] ABSTRACT

A readout apparatus for indicating data recorded in the form of marks bearing different widths and intervening blanks also having different widths which comprises a photosensitive device for optically detecting narrow marks and intervening narrow blanks and generating corresponding electric signals; a second photosensitive device for optically detecting broad marks and intervening broad blanks and generating corresponding electric signals; and an electric circuit for reading out a difference between both electric signals and sending forth signals representing the above-mentioned broad and narrow marks and intervening broad and narrow blanks from said difference.

2 Claims, 15 Drawing Figures

CODE READOUT APPARATUS

This invention relates to a code readout apparatus and more particularly to a readout apparatus for optically reading out data coded in the form of juxtaposed marks and intervening blanks respectively having different widths.

Such type of data generally admits of dense recording and in consequence the compactness of a recording medium, and is used as an input to an automatic readout device for indicating, for example, amounts given or price tags used by merchant stores. The prior art device adopted for such readout operation comprises two detectors arranged before and after in the scanning direction and is so designed as to measure the widths of marks and those of intervening blanks and readout data. However, such conventional readout device is demanded to have a sufficiently high resolving power for detection of the fine edges of marks. As the result, not only the readout head is of complicated construction, but also elements constituting said readout heat should be designed with high precision. If the readout head happens to be inclined at the time of scanning, then the focal point of either of the two detectors will be displaced, resulting in the failure to readout data correctly, and consequently scanning by the readout head will have to be effected with utmost care. Moreover, since the readout head tends to rotate depending on the manner in which it is held by the hand, it is necessary to determine in advance which of plural detectors should be made to precede the others, thus requiring the provision of a complicated logic circuit arrangement.

It is accordingly the object of this invention to provide a code readout apparatus capable of easily reading out data coded in the form of juxtaposed marks and intervening blanks respectively having different widths. The code readout apparatus of this invention is little affected by the inclination or rotation of the readout head and changes in its scanning speed, thus attaining a stable readout operation regardless of the operating condition of said apparatus and moreover eliminating the necessity of providing a complicated logic circuit arrangement.

This invention can be more fully understood from the following detailed description when taken in conjunction with the accompanying drawings, in which:

FIG. 12 is a time chart illustrative of the operation of the judgment circuit of FIG. 9 wherein FIGS. 12a to 12n show the respective output signals from the different elements;

There will now be described by reference to the appended drawings a code readout apparatus according to the preferred embodiments of this invention.

Figures 1, 2, 3, 4, 5, 6:
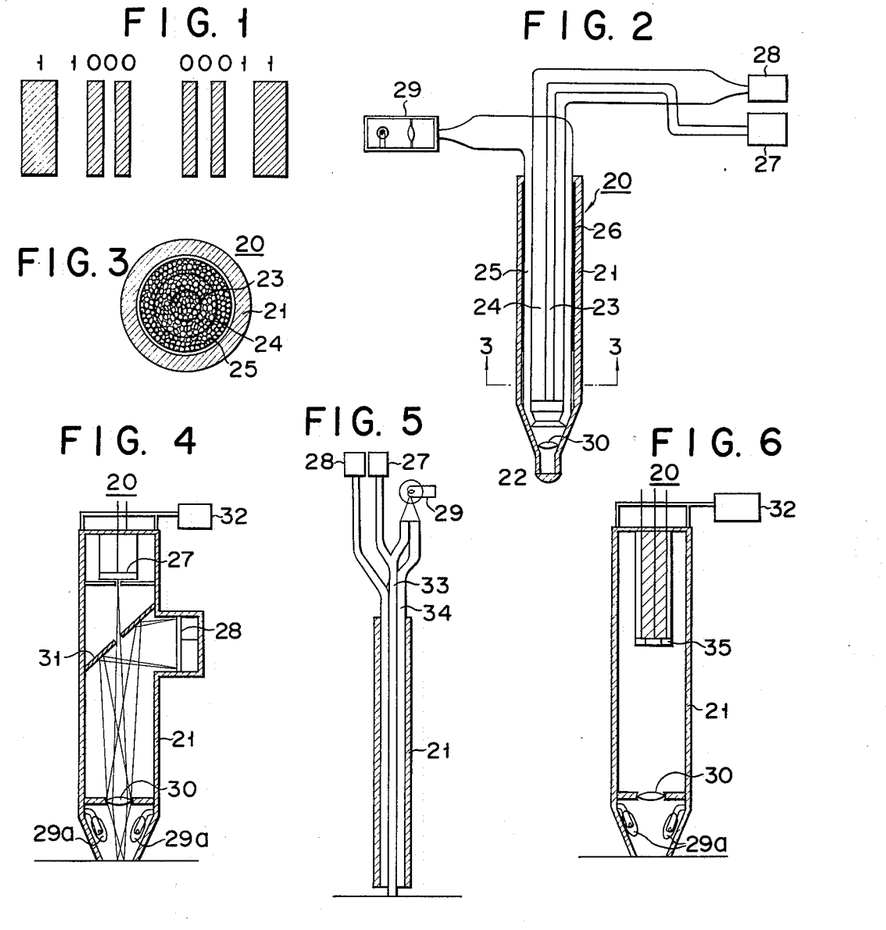
FIG. 1 illustrates part of coded data read out by a code readout apparatus according to an embodiment of this invention.
FIG. 2 is a schematic longitudinal sectional view of the readout head of the code readout apparatus of FIG. 1.
FIG. 3 is an enlarged cross sectional view on line 3–3 of FIG. 2.
FIG. 4 is a schematic longitudinal sectional view of a modification of the readout head of FIG. 2.
FIG. 5 is a schematic longitudinal sectional view of another modification of the readout head of FIG. 2.
FIG. 6 is a schematic longitudinal sectional view of still another modification of the readout head of FIG. 2.

Referring to FIG. 1 illustrating coded data being read out by the code readout apparatus of this invention, said data has a pattern consisting of a group of broad and narrow hatched marks and another group of intervening broad and narrow blanks. The broad hatched marks and blanks correspond to a "1" bit and the narrow hatched marks and blanks to a "0" bit. The data of FIG. 1 has a 5-bit binary code pattern consisting of a broad mark, a broad blank, a narrow mark, a narrow blank and a narrow mark as counted from the left side and another 5-bit binary code pattern formed of a narrow mark, a narrow blank, a narrow mark, a broad blank and broad mark as viewed from the left side. In other words, the data of FIG. 1 is a 5-bit "2 out of 5 code" capable of expressing a decimal number system. This data can also indicate a start and end as a special code with the first and last bits of a code represented by a mark.

There will now be described the readout head 20 shown in FIGS. 2 and 3. This readout head 20 has a cylindrical housing 21 made of opaque material, tapered in the end portion so as to be easily held by the hand, and fitted, though not alway required, with a converge lens 22 at the end opening. A core optical tube 23 and a surrounding optical tube 24 both made of a bundle of optical fiber are partially inserted in the housing 21 in a concentrical relationship. The forward end portion of said surrounding optical tube 24 is concentrically enclosed in the forward end portion of an outermost optical tube 25 also made of a bundle of optical fibers. A black light-shielding material 26 is provided between the outer wall of part of the forward end portion of the outermost optical tube 25 and the inner wall of part of the housing 21.

Figure 12:
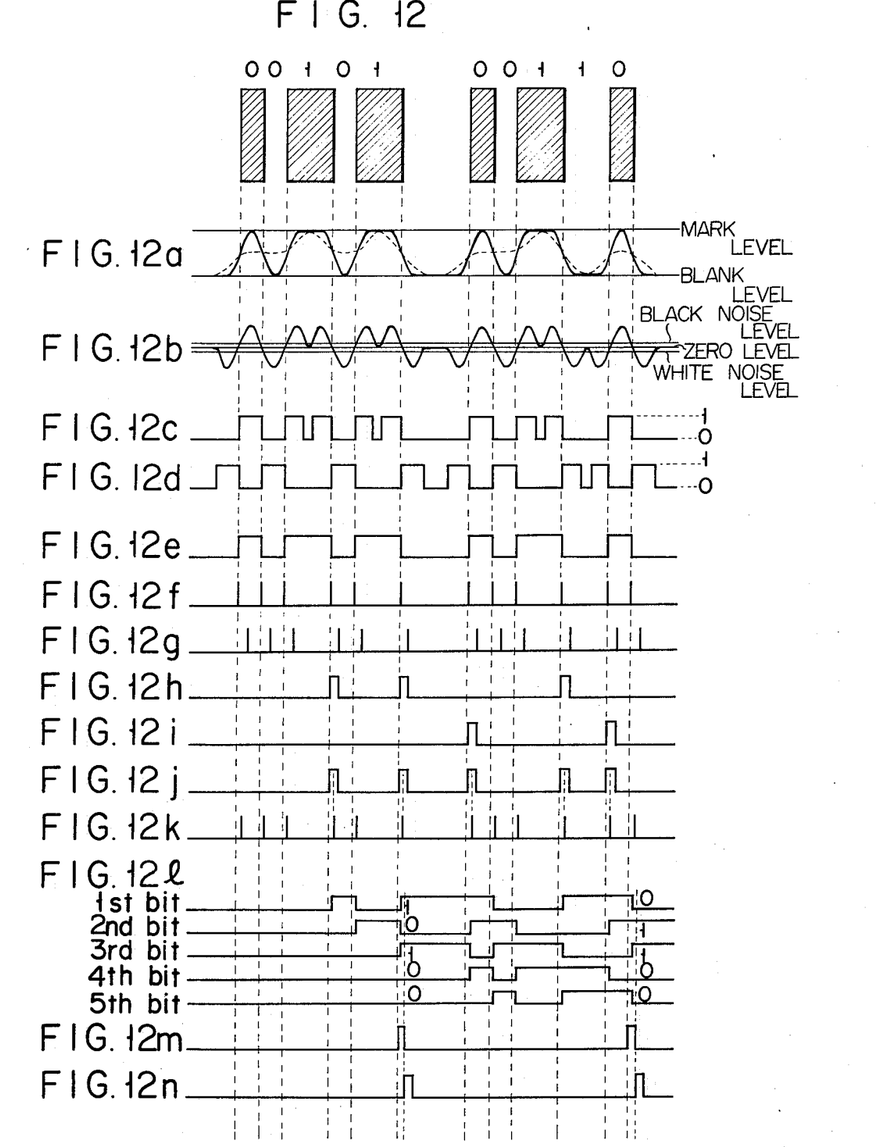

The rear end of the first or core optical tube 23 and that of the second or surrounding optical tube 24 are connected to first and second photosensitive devices 27, 28 respectively. The rear end of the third or outermost optical tube 25 is connected to a light source 29. The optical detectors 27, 28 may consist of a type capable of generating an electric signal corresponding to an amount of incoming light, for example, a photomultiplier or photodiode. The light source 29 may consist of a light-projecting element giving forth a fixed amount of light and a lens for focusing a light delivered therefrom. The forward end faces of both first and second optical tubes 23, 24 are made flush with each other and face the aforesaid focusing lens 22 through another intervening focusing lens 30. The forward end face of the third optical tube 25 extends slightly ahead of the end faces of the first and second optical tubes 23, 24.

Where a recording medium stored with data is scanned by holding the housing 21 of the readout head 20 with the first focusing lens 22 gently pressed against the surface of the recording medium, then light from the source 29 is projected on the surface of said recording medium through the third optical tube 25. Light reflected from the illuminated surface of the recording medium is brought to the optical detectors 27, 28 through the first and second optical tubes 23, 24. In this case, the first or core optical tube 23 is designed to receive light reflected from a central narrow area on the illuminated surface of the recording medium, and the second optical tube 24 to receive light reflected from a broad area (including said central narrow area) on said illuminated medium surface. The first photosensitive device 27 detects light conducted through the first optical tube 23 and the second optical detector 28 receives light passed through the second optical tube 24. The first photosensitive device 27 is chosen to have a sufficient power to resolve even the narrowest marks and blanks, and the second photosensitive device is designed to have a sufficient power to resolve even the narrowest ones of the broad marks and blanks. Where the data of FIG. 1 is scanned by the readout head 20, electric outputs from the photosensitive devices 27, 28 take the wave form shown in FIG. 12a. The solid curve of FIG. 12a represents the wave form of an output from the first photosensitive device 27, and the dotted curve that of an output from the second photosensitive device 28. As seen from FIG. 12a, an output from the optical detector 27 for detecting light reflected from the central part of the illuminated surface of a recording medium has such a wave form as never fails to reach the prescribed level of the mark and blank whether they are broad or narrow. In contrast, the second optical detector 28 detects light collected from a large area on the illuminated medium surface, providing an indistinct image. Therefore, an output from the second optical detector 28 has such a wave form as reaches the prescribed level of the broad mark and blank, but does not cover the prescribed level of the narrow mark and blank due to the effect of light reflected from the adjacent blanks and marks. The code readout apparatus of this invention is designed, as later described, to determine the width of the respective marks and blanks from a difference between outputs from the first and second optical detectors 27, 28.

There will now be described by reference to FIG. 4 a modification of the readout head 20 of FIG. 2. Lamps 29a are provided on the inner peripheral wall of the housing 21 near the forward end. Light projected by the lamps 29a on a recording medium and reflected therefrom enters the housing 21 through a focusing lens 30. Received in the housing 21 is a reflection plate 31 bored at the center and inclined 45° to the axial line of the housing 21. Light reflected from the central portion of the illuminated surface of a recording medium passes through the central hole of the reflection plate 31 to the first or central photosensitive device 27. Light reflected from the peripheral portion of the illuminated medium surface is reflected 90° from the axial line of the housing 21 by the reflection plate 31 and brought to the second or peripheral photosensitive device 28. Therefore, the modification of FIG. 4 enables the first and second detectors 27, 28 to produce outputs as those obtained in FIG. 2. Referential numeral 32 of FIG. 4 denotes a power source of the lamps 29a.

There will now be described by reference to FIG. 5 another modification of the readout head 20 of FIG. 2. The forward end portions of the first and second optical tube 33, 34 made of a bundle of optical fibers are inserted into the cylindrical housing 21. The first optical tube 33 conducts light reflected from the central area of the illuminated surface of a recording medium, and the second optical tube 34 concentrically surrounds the first optical tube 33 to conduct light reflected from the peripheral portion of the illuminated medium surface. In the modification of FIG. 5, the third optical tube 25 of FIGS. 2 and 3 is omitted. Instead, the optical fibers constituting the first and second optical tubes 33, 34 are mixed at random with the optical fibers for conducting light from the source 29, eliminating the necessity of providing a light-focusing means, for example, a lens. The forward end of the first optical tube 33 projects a little ahead of that of the second optical tube 34. Where data stored in a recording medium is scanned by the readout head with the projecting end of the first optical tube 33 gently contacted with the surface of the recording medium, then light reflected from the central area of said surface is more efficiently focused.

Figure 7:
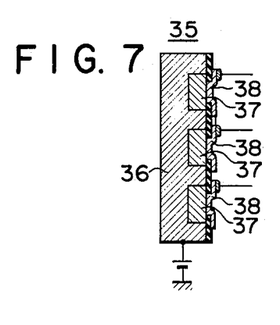
FIG. 7 is a cross sectional view of a photo-electric conversion element used with the readout head of FIG. 6.
Figure 8:
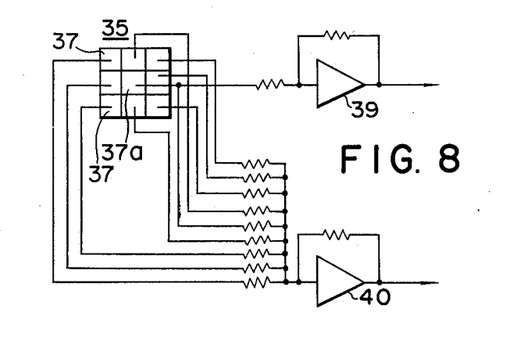
FIG. 8 illustrates a circuit for drawing out an electric output from the photo-electric conversion element of FIG. 7.

According to the modification of FIG. 6 of the readout head 20, light projected by the lamps 29a provided on the inner walls of the housing 21 near the forward end is reflected from the illuminated surface of a recording medium and, after focused by the focusing lens 30, brought into a photocell array 35 shown in FIG. 7 in enlargement. This photocell array includes a P-type silicon substrate 36 and nine N-type island regions 37 arranged in a matrix form prepared by selectively diffusing an impurity through the surface of the substrate 36. Provided on the surface of the N-type regions 37 are electrodes 38, to which leads are connected at one end. As shown in FIG. 8, the central one 37a of the nine N-type regions 37 is supplied with light reflected from the central area of the illuminated surface of a recording medium, and all the N-type regions 37 receive light reflected from the peripheral portion of the illuminated medium surface. An output from the central N-type region 37a is drawn out through a first arithmetic operation amplifier 39, and outputs from all the N-type regions 37 are delivered from a second arithmetic operation amplifier 40.

There will now be described by reference to FIGS. 9 to 12 a judgment circuit for determining the different widths of the marks and blanks from an output representing light reflected from the central area of the illuminated surface of a recording medium and outputs corresponding to light reflected from the peripheral portion of said medium surface.

Figures 9, 10, 11A, 11B:
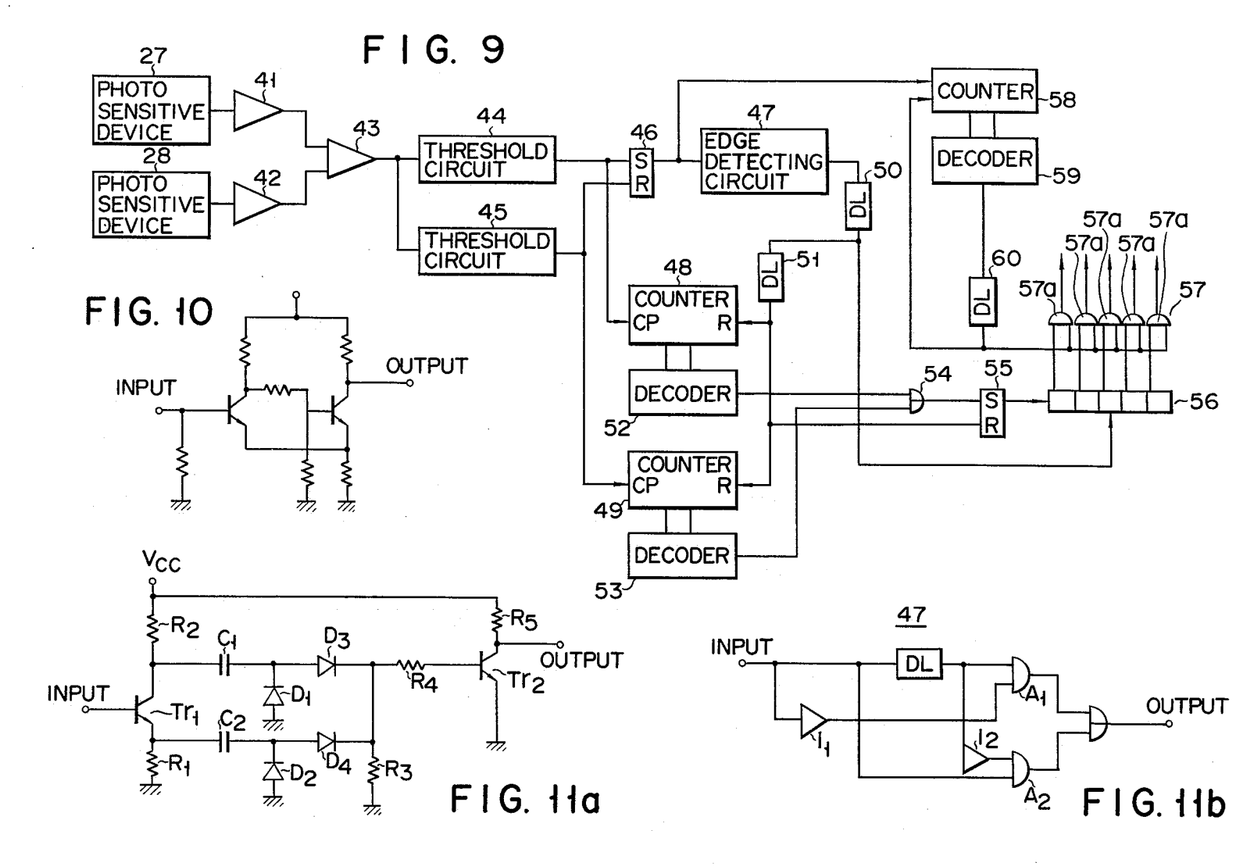
FIG. 9 shows a judgment circuit used with the readout head of this invention.
FIG. 10 indicates a concrete quantized threshold-defining circuit used with the judgment circuit of FIG. 9.
FIGS. 11a and 11b are concrete edge-detecting circuits used with the judgment circuit of FIG. 9.

In FIG. 9, outputs from the first photosensitive device 27 and the second photosensitive device 28 are supplied to arithmetic amplifiers 41, 42 respectively. The amplifiers 41, 42 amplify outputs from the detectors 27, 28 to such extent that the peak outputs from said detectors 27, 28 whose wave forms reach the prescribed levels of the marks and blanks coincide with each other. Outputs from the arithmetic operation amplifiers 41, 42 are conducted to the first and second input terminals of a differential amplifier 43, thus determining a difference between outputs from both amplifiers 41, 42. An output from the differential amplifier 43 has such a wave form as illustrated in FIG. 12b.

An output from said differential amplifier 43 is conducted to a black quantized threshold-defining circuit 44 and also to a white quantized threshold circuit 45. The black quantized threshold-defining circuit 44 may be formed of an analogue comparator circuit for generating a positive pulse where the level of the above-mentioned balance signal obtained from the differential amplifier 43 is positioned on the mark side above the noise level which itself is also set slightly above the zero level on the mark side. The white quantized threshold-defining circuit 45 may be constructed by a combination of an analogue comparator circuit for producing a negative pulse where the level of said balance signal delivered from the differential amplifier 43 is disposed on the blank side below the noise level which itself is also set slightly below the zero level on the blank side, and an inverter circuit for inverting a negative pulse into a positive one. The above-mentioned comparator circuits may be formed of a type well known to this particular field, for example, the $\mu$A 710C type of FAIR CHILD Company actually marketed in the integrated form. The analogue comparator may also consist of a Schmidt trigger circuit using, as shown in FIG. 10, two common-emitter transistors.

An output from the black quantized threshold-defining circuit 44 has a wave form shown in FIG. 12c, and an output from the white quantized threshold-defining circuit 45 has a wave form indicated in FIG. 12c and 12d represents a "0" signal and the referential level of said wave forms denotes a "1" signal. It will be noted that two pulse signals are generated at those points on the wave forms of outputs from the black and white quantized threshold-defining circuits 44, 45 which correspond to the broad mark and blank.

An output from the blank quantized threshold-defining circuit 44 is supplied to the set terminal of a region-judging flip-flop circuit 46. An output from the white quantized threshold-defining circuit 45 is conducted to the reset terminal of said region-judging flip-flop circuit 46. Where, therefore, the level of an output from the differential amplifier 43 rises above the noise level on the mark side, then the region-judging flip-flop circuit 46 is set, and where the level of an output from said amplifier 43 falls below the noise level on the blank side, then the region-judging flip-flop circuit 46 is reset. Accordingly, an output from the region-judging flip-flop circuit 46 has a wave form illustrated in FIG. 12e. As seen from the wave form, the mark region corresponds to the "1" state of the region-judging flip-flop circuit 46, and the blank region of the "0" state thereof. An output from the region-judging flip-flop circuit 46 is supplied to an edge detecting circuit 47, where said output is differentiated and represented with an absolute value. An output from the edge detection circuit 47 has a wave form shown in FIG. 12f. This edge detection circuit 47 may be constructed by a combination of a known differentiation circuit and an absolute value-defining circuit, for example, the ones shown in FIGS. 11a and 11b.

Where the edge detection circuit 47 of FIG. 11a is supplied with an input of rectangular wave, a transistor Tr1 is actuated to generate rectangular waves of opposite polarities from the emitter and collector. Where the input terminal of said edge detection circuit 47 is supplied with a signal of "0" level, then a signal of "0" level appears at the emitter of the transistor Tr1 and a signal of "1" level at the collector thereof, thereby charging a capacitor C1. Where the input terminal receives a signal of "1" level, then a signal of "1" level is produced at the emitter of the transistor Tr1 and a signal of "0" level at the collector thereof, thereby discharging the capacitor C1 through a diode D1. On the other hand, a capacitor C2 is charged with a time constant C2R3 determined by a series circuit consisting of said capacitor C2, diode D4 and resistor R3. While the capacitor C2 is discharged, the resistor R3 has a positive potential. Where the input terminal of the edge detection circuit 47 is again supplied with a signal of "0" level, then the capacitor C2 is discharged through a diode D2, causing the capacitor C1 to be charged with a time constant C1 (R2+R3) determined by a series circuit consisting of the collector of the transistor Tr1, capacitor C1, diode D3 and resistor R3. While the capacitor C1 is charged, the resistor R3 has a positive potential. When the potential of the resistor R3 is applied through a circuit including the transistor Tr2, then a pulse is generated from the output terminal of the edge detection circuit 47 for a period C2R3 or C1 (R2+R3) at the rise of the rectangular wave of an input signal as well as at the fall thereof. Where the period C2R3 is made equal to the period C1 (R2+R3) at a sufficiently small level, then a narrow pulse is obtained.

According to a modification of FIG. 11b of the edge detection circuit 47, an input signal of rectangular wave is supplied to both input terminals of a first AND circuit A1 through a delay circuit DL and a first inverter I1 respectively. The input signal of rectangular wave is also conducted to one input terminal of a second AND circuit A2 and also to the other input terminal thereof through a second inverter I2 delayed by the delay circuit DL. Outputs from the first and second AND circuits A1, A2 are drawn out of the edge detection circuit 47 through an OR circuit with substantially the same wave from as outputs obtained in FIG. 11a. It is obviously required for the edge detection circuit of FIG. 11b that the delay time of the delay circuit DL be so fixed as to reduce the width of an output pulse signal as much as possible.

The output terminals of the black quantized threshold-defining circuit 44 and white quantized threshold-defining circuit 45 are connected to the clock pulse input terminals of a black signal counter 48 and white signal counter 49 respectively. The reset terminals of both counters 48, 49 are connected to the output terminal of the edge detection circuit 47 through first and second delay circuits 50, 51 respectively. The output terminals of both counters 48, 49 are connected to a black signal decoder 52 and white signal decoder 53 respectively to produce an output signal when both counters 48, 49 make two counts. As the result, the reset terminals of the black and white signal counters 48, 49 are supplied with an input signal having a wave form shown in FIG. 12a, causing outputs from the decoders 52, 53 to have the wave forms of FIGS. 12h and 12i respectively which enable pulses to be produced when lights representing the mark and blank are received.

The output terminals of the black and white signal decoders 52, 53 are connected to the set terminal of a flip-flop circuit 55 through an OR circuit 54. The reset terminal of the flip-flop circuit 55 is connected to the output terminal of the edge detection circuit 47 through the first and second delay circuits 50, 51. Therefore, the flip-flop circuit 55 generates an output signal having the wave form of FIG. 12j. The output terminal of the flip-flop circuit 55 is connected to the input terminal of a 5-bit shift register 56, whose shift terminal is connected to the output terminal of the edge detection circuit 47 through the first delay circuit 50. Accordingly, the shift register 56 generates a shift pulse at a shorter delay time than a reset pulse. Namely, the shift register 56 is supplied with two pulses corresponding to the broad mark and blank. FIG. 12k shows shift pulse supplied to the shift terminal of the shift register 56 and FIG. 12l indicates the wave forms of outputs from the respective bits of the shift register 56.

Outputs from the respective bits of the shift register 56 are supplied to one input terminal of the respective AND circuits 57a of a code indicating circuit 57.

The output terminal of the first flip-flop circuit 56 is connected to a decoder 59 through a counter 58. When the counter 58 makes three counts, namely, when three pulses are brought thereto, then said counter 58 generates an output pulse. An output signal from the decoder 59 has a wave form shown in FIG. 12m. Outputs from the decoder 59 are supplied to the other input terminal of the respective AND circuits 57a of the code indicating circuit 57. Said AND circuits 57a generate a logic product of a signal having a wave form of FIG. 12n and a signal having a wave form of FIG. 12l, thereby indicating a code representing an actual mark or blank.

Figure 13:
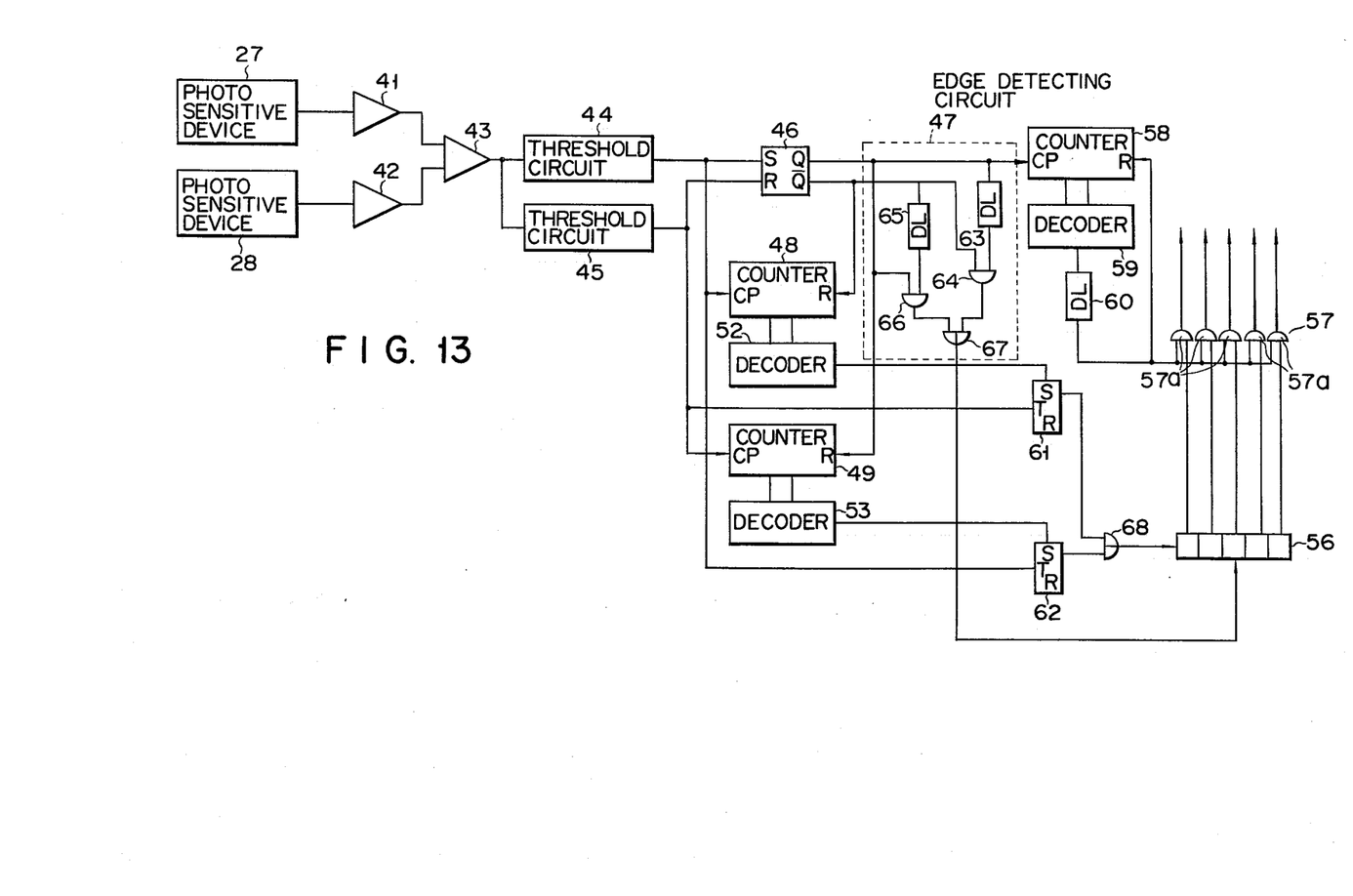
FIG. 13 is a circuit diagram of a modification of the judgment circuit of FIG. 9.

The judgment circuit of this invention is not limited to the type shown in FIG. 9, but may consist of an arrangement indicated in FIG. 13. The judgment circuit of FIG. 13 eliminates the necessity of measuring the timing in which the counter is reset and consequently is easy to control.

There will now be described by reference to FIG. 14 the operation of the judgment circuit of FIG. 13. The parts of FIG. 14 the same as those of FIG. 9 are denoted by the same numerals and description thereof is omitted.

Figure 14:
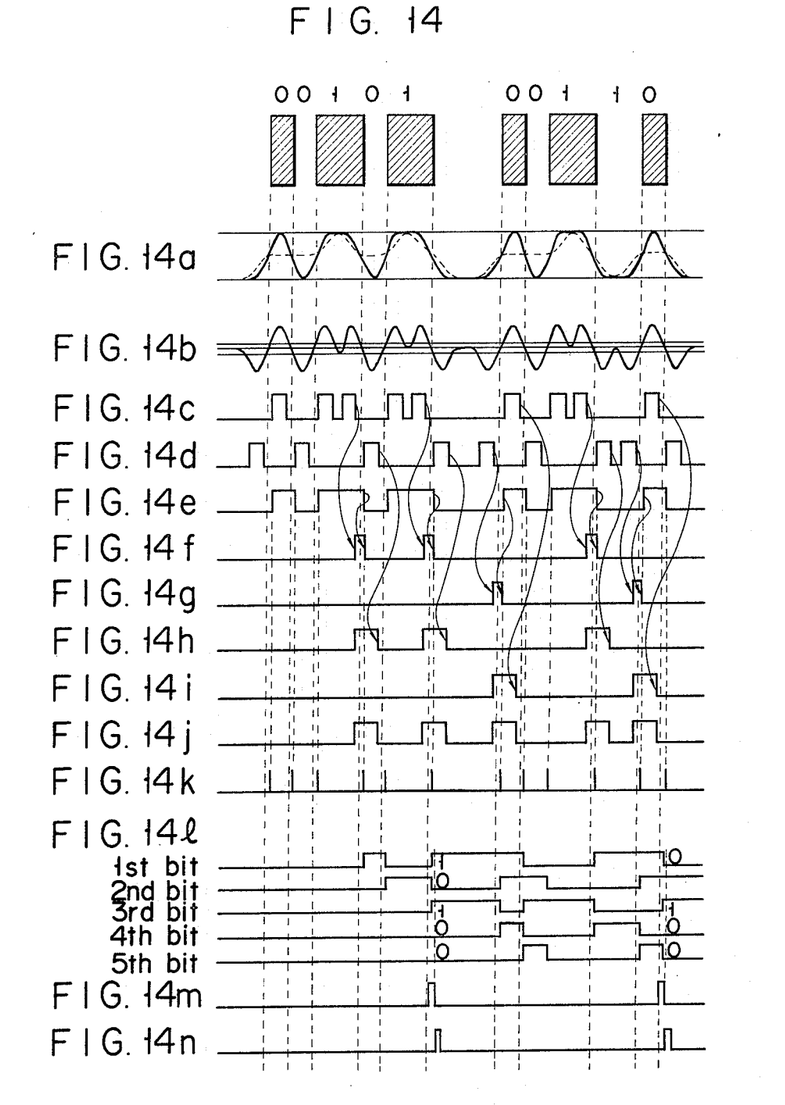
FIG. 14 is a time chart illustrative of the operation of the judgment circuit of FIG. 13.

Referring to FIG. 14, FIG. 14a shows the wave forms of outputs from both detectors 27, 28; FIG. 14b the wave form of an output from the differential amplifier 43; FIG. 14c the wave form of an output from the black quantized threshold-defining circuit 44; and FIG. 14d the wave form of an output from the white quantized threshold-defining circuit 45.

The black signal counter 48 counts the rear edge of output pulses from the black quantized threshold-defining circuit 44 and is reset by an output from the Q side of the flip-flop circuit 46. Therefore, said black signal counter only counts black quantized outputs representing a black region and remains inoperative with respect to a white region. Similarly, the white signal counter only counts white quantized outputs representing the white region, and is kept inoperative with respect to the black region. Outputs from the counters 48, 49 are supplied to the decoders 52, 53, which judge whether the counters 52, 53 made two counts. When two counts were made, the decoders 52, 53 generate an output pulse which in turn set flip-flop circuits 61, 62; FIG. 14f shows the wave form of an output signal from the black signal decoder 48; FIG. 14g the wave form of an output signal from the white signal decoder 49; FIG. 14h the wave form of an output signal from the black signal flip-flop circuit 61; and FIG. 14i the wave form of an output signal from the white signal flip-flop circuit 62. These flip-flop circuits 61, 62 are of the SRT type, an output from which is reversed at the fall of an input pulse supplied to the T-terminal. The T-terminal of the flip-flop circuit 61 is connected to the output terminal of the white quantized threshold-defining circuit 45 and the T-terminal of the other flip-flop circuit 62 is connected to the output terminal of the black quantized threshold-defining circuit 44. Thus the black signal flip-flop circuit 61 is reset by the rear edge of a first white quantized output pulse delivered from the white region, and the white signal flip-flop circuit 62 is similarly reset by the rear edge of a first black quantized output pulse generated from the black region. The previously described region-judging flip-flop circuit 46 is provided on its output side with the edge detection circuit 47 for detecting the rear edge of an output pulse from said region-judging flip-flop circuit 46. The edge detection circuit 47 comprises an AND circuit 64, one input terminal of which is connected to the Q-output terminal of the region-judging flip-flop circuit 46 through a delay circuit 63 and the other input terminal of which is connected to the Q-output terminal of said region-judging flip-flop circuit 46; and an AND circuit 66, one input terminal of which is connected to the Q-output terminal of the region-judging flip-flop circuit 46 through a delay circuit 65 and the other input terminal of which is connected to the Q-output terminal of said region-judging flip-flop circuit 46. The output terminals of both AND circuits 64, 66 are connected to the shift terminal of the 5-bit shift register 56 through an OR circuit 67. The shift register 56 is supplied with outputs from both flip-flop circuits 61, 62 through an OR circuit 68. Accordingly, each time the region is changed to the mark or blank, the shift register 56 is progressively supplied with a signal showing whether the region immediately before said change received two black or white quantized output pulses. An output signal from the OR circuit 68 has the wave form of FIG. 14j; an input signal to the shift terminal of the shift register 56 the wave form of FIG. 14k; output signals from the respective bits of the shift register 56 the wave forms of FIG. 14l; an output signal from the decoder 59 (though not described) the wave form of FIG. 14m; and an output signal from the delay circuit 60 the wave form of FIG. 14n.

As mentioned above, the code readout apparatus of this invention is characterized in that it is of simple construction; optically reads out an output representing the central portion of an image on a recording medium and an output indicating the peripheral portion of said image separately; determines a difference between electric signals corresponding to said both outputs to distinguish between the region of the mark and that of the blank; and detects whether outputs denoting the distinguished regions accord with each other to determine the width of the mark and blank. The code readout apparatus of this invention is therefore capable of indicating not only marks but also intervening blanks as data, admitting of high density coding and reducing the size of a data carrier such as a price tag. Insofar as the object of this invention is concerned, optical outputs from the peripheral portion of an image on the illuminated surface of a recording medium is allowed to be vague. Therefore, the present code readout apparatus is little affected by the inclination of the readout head nor by the direction in which light is brought into the readout head, thereby always attaining correct readout operation, even when the readout head rotates and in consequence admitting of the easy handling of the readout head. Since light reflected from the narrow and broad areas of an image on the surface of a recording medium are photoelectrically converted into electric signals, and a difference between said electric signals is determined, reading can be effected stably regardless of the scanning speed of the readout head. Further, the judgment circuit of such simple construction as described in the foregoing embodiments effectively assists the code readout apparatus of this invention to fulfil its function.

What is claimed is:

1. A code readout apparatus for reading out information indicated in the form of broad and narrow marks and intervening broad and narrow blanks juxtaposed in the scanning direction, which comprises a readout head having a first detector for reading out an output representing the central area of an image on the illuminated surface of a recording medium and converting said output into an electrical signal, and a second detector for reading out an output denoting the peripheral area of said image and converting said output into an electric signal; a judgment circuit provided with means for indicating a difference between outputs from the first and second detectors and means for judging from said difference whether the marks and blanks are broad or narrow, the first and second detectors each being provided with a semiconductor device received in the readout head and formed of a large number of juxtaposed PN junctions, the central one of which is supplied with light reflected from the central area of an image on the surface of a recording medium and all the junctions of which are supplied with light reflected from the peripheral portion of said image.

2. A code readout apparatus according to claim 1 wherein the judgment circuit comprises a differential amplifier for indicating a difference between electric signals from the first and second detectors; a black quantized threshold-defining circuit for converting an output from said differential amplifier into a black signal which indicates a narrow mark by one pulse having a prescribed level, a broad mark by two pulses having the prescribed level and a broad blank by a pulse having a zero level; a white quantized threshold-defining circuit for converting an output from said differential amplifier into a white signal which indicates a narrow blank by one pulse having a prescribed level, a broad blank by two pulse having the same prescribed level, and a broad mark by a pulse having a zero level; means for producing pulses indicating the rear edge of pulses representing broad marks and blanks from outputs generated by the black quantized threshold-defining circuit and white quantized threshold-defining circuit; a bistable circuit whose set terminal is supplied with an output from the black quantized threshold-defining circuit and whose reset terminal is supplied with an output from the white quantized threshold-defining circuit; an edge detection circuit for differentiating an output from the distable circuit and indicating the absolute value of said differentiated output; a shift register receiving an output from the means for indicating the rear edge of pulses and carryng out shifting upon receipt of an output from the edge detection circuit; and means for digitally indicating information stored in the recording medium from the logic product of outputs from the respective bits of the shift register and prescribed output pulses from said shift register.

* * * * *